(12) United States Patent
Kishimoto et al.

(10) Patent No.: US 7,715,214 B2
(45) Date of Patent: May 11, 2010

(54) MALFUNCTION DETERMINING DEVICE FOR DRIVE CIRCUIT AND DRIVE UNIT INCLUDING THE SAME, AND METHOD FOR DETERMINING MALFUNCTION IN DRIVE CIRCUIT

(75) Inventors: Takeshi Kishimoto, Nagoya (JP); Masaya Amano, Toyota (JP); Nobuyuki Tanaka, Toyota (JP); Kouji Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 11/884,235

(22) PCT Filed: Mar. 2, 2006

(86) PCT No.: PCT/IB2006/000446
§ 371 (c)(1),
(2), (4) Date: Aug. 13, 2007

(87) PCT Pub. No.: WO2006/092715
PCT Pub. Date: Sep. 8, 2006

(65) Prior Publication Data
US 2008/0170421 A1    Jul. 17, 2008

(30) Foreign Application Priority Data
Mar. 3, 2005  (JP) .............................. 2005-058473
Jan. 31, 2006  (JP) .............................. 2006-022456

(51) Int. Cl.
*H02M 3/18* (2006.01)
(52) U.S. Cl. ................................................. 363/56.02

(58) Field of Classification Search ................... 363/16, 363/17, 55, 56.01–56.04, 97, 98, 131, 132; 361/23–25, 93.8, 103, 104
See application file for complete search history.

(56) References Cited

U.S. PATENT DOCUMENTS

| | | | |
|---|---|---|---|
| 5,115,388 A * | 5/1992 | Shigekane | 363/56.03 |
| 5,500,792 A | 3/1996 | Jeon et al. | |
| 6,081,103 A * | 6/2000 | Pierret | 322/36 |
| 6,653,745 B1 * | 11/2003 | Masaki et al. | 307/10.1 |

(Continued)

FOREIGN PATENT DOCUMENTS

JP    A 07-73983    3/1995

(Continued)

*Primary Examiner*—Matthew V Nguyen
(74) *Attorney, Agent, or Firm*—Oliff & Berridge, PLC

(57) ABSTRACT

A device and method for determining whether a malfunction is present in a drive circuit, which drives an electric device that generates counter-electromotive force, when all gates in the switching elements of the drive circuit are blocked. After the gates are blocked, the temperature of the switching elements is monitored and the presence of a malfunction is determined based on the detected temperature of the switching elements. A malfunction is determined to be present when the detected temperature equals or exceeds a predetermined temperature; the change in the detected temperature equals or exceeds a predetermined value; or the rate of change in the detected temperature equals or exceeds than a predetermined rate. Thus, it can be appropriately determined whether the gates in the drive circuit are appropriately blocked and minimize the influence of any malfunctions on other elements outside of the drive circuit.

17 Claims, 9 Drawing Sheets

U.S. PATENT DOCUMENTS

| | | | |
|---|---|---|---|
| 7,212,891 B2 * | 5/2007 | Sato | 701/22 |
| 7,453,679 B2 * | 11/2008 | Yokai et al. | 361/93.8 |
| 7,538,523 B2 * | 5/2009 | Kitamura et al. | 322/33 |
| 2004/0008457 A1 | 1/2004 | Iimura et al. | |

FOREIGN PATENT DOCUMENTS

| | | |
|---|---|---|
| JP | A 07-194094 | 7/1995 |
| JP | A 08-214402 | 8/1996 |
| JP | A 11-341884 | 12/1999 |
| JP | A 2000-134947 | 5/2000 |
| JP | A 2002-159183 | 5/2002 |

* cited by examiner

MALFUNCTION DETERMINING DEVICE FOR DRIVE CIRCUIT AND DRIVE UNIT INCLUDING THE SAME, AND METHOD FOR DETERMINING MALFUNCTION IN DRIVE CIRCUIT

INCORPORATION BY REFERENCE

The disclosure of Japanese Patent Application No. 2005-058473 filed on Mar. 3, 2005 and No. 2006-022456 filed on Jan. 31, 2006, including the specification, drawings and abstract is incorporated here by reference in its entirety.

BACKGROUND OF THE INVENTION

1. Field of the Invention

The invention relates generally to a malfunction determining device for a drive circuit, a drive unit including such malfunction determining device, and a method for determining whether a malfunction is present in the drive circuit. In particular, the invention relates to a malfunction determining device that determines whether a malfunction is present in a drive circuit that drives an electric device, which generates counter-electromotive force while running, using a plurality of switching elements, a drive unit including such malfunction determining device, and a method for determining whether a malfunction is present in the drive circuit.

2. Description of the Related Art Japanese Patent Application Publication No. JP-A-2000-134947 describes a malfunction determining device, which blocks gates of switching elements when detecting overcurrent supplied to the switching elements included in an inverter device. In such a device, an electric current sensor (e.g. a hole CT) is provided in series with a capacitor arranged between a positive bus bar and a negative bus bar that are connected to the switching elements of the inverter device, the hole CT detects overcurrent supplied to the switching elements, and the gates of the switching elements are blocked when the hole CT detects the overcurrent.

With the malfunction determining device for a drive circuit described above, however, even when the gates of the switching elements are blocked, if a failure is present in at least one of the switching elements and the switching element cannot be turned OFF (hereinafter, this failure will be referred to as an "ON-failure"), a supply of overcurrent is not detected. This may cause problems, for example, the inverter is damaged due to overheat. The inverter is used to drive a motor and an electric power generator. Many types of motors and electric power generators generate counter-electromotive force while running. Accordingly, if an ON failure occurs in a switching element of the inverter while the motor or the electric power generator, which generates such counter-electromotive force, is running, even if the gates of the switching elements in the inverter are blocked, a closed circuit is formed by the switching element, where the ON-failure is present, and a wound-coil of the motor or the electric power generator. As a result, electric current flows due to the counter-electromotive force generated while the motor or the electric power generating is running. Due to such electric current, although the gates are blocked, the switching elements overheat, resulting in possible damage to the inverter or motor.

SUMMARY OF THE INVENTION

It is an object of the invention to provide a malfunction determining device and method for a drive circuit that can determine whether a malfunction has occurred in blocking of gates of switching elements in a drive circuit that drives an electric device that generates counter-electromotive force. It is another object of the invention to provide a drive unit that can more appropriately deal with the malfunction in blocking of the gates of the switching elements in the drive circuit that drives the electric device that generates counter-electromotive force.

A first aspect of the invention relates to a malfunction determining device that determines whether a malfunction is present in a drive circuit, which drives an electric device that generates counter-electromotive force while running, using a plurality of switching elements constituting a drive device, and that includes a temperature detector that detects a temperature of at least one of the electric device and the drive device; and a malfunction determiner that detects whether a malfunction has occurred in blocking of gates of the switching elements based on the temperature detected by the temperature detector while all the gates of the switching elements in the drive circuit are blocked.

With the malfunction determining device for a drive circuit according to the first aspect, it is determined whether a malfunction has occurred in blocking of the gates based on the temperature of at least one of the electric device and the drive device, which is detected while all the gates of switching elements are blocked. As a result, it is possible to more appropriately deal with the malfunction. Whether a malfunction has occurred in blocking of the gates can be determined based on the temperature of at least one of the electric device and the drive device, because the switching elements are heated by the electric current flowing through a closed circuit formed due to the switching element where an ON-failure is present.

In the malfunction determining device for a drive circuit according to the first aspect, the temperature detector may detect a temperature of the switching elements in the drive circuit.

In this case, whether a malfunction has occurred in blocking of the gates is determined based on the temperature of the switching elements that is detected while all the gates of the switching elements in the drive circuit are blocked. As a result, it is possible to more appropriately deal with the malfunction. Whether a malfunction has occurred in blocking of the gates can be determined based on the temperature of the switching elements, because the switching elements are heated by the electric current flowing through a closed circuit formed due to the switching element where an ON-failure is present. Here, examples of the "electric device" are a motor and an electric power generator that can receive and output power, and an example of the "drive circuit" is an inverter circuit.

In the malfunction determining device for a drive circuit, which determines whether a malfunction is present based on the temperature of the switching elements, the malfunction determiner may determine that a malfunction is present when the detected temperature becomes equal to or higher than the predetermined temperature, when the change in the detected temperature becomes equal to or greater than the predetermined value, or when the rate of change in the detected temperature becomes equal to or higher than the predetermined rate.

In the malfunction determining device for a drive circuit according to the first aspect, the temperature detector may detect the temperature of the electric device.

In this case, whether a malfunction has occurred in blocking of the gates is determined based on the temperature of the electric device that is detected while all the gates of the switching elements in the drive circuit are blocked. As a result, it is possible to more appropriately deal with the malfunction. Whether a malfunction has occurred in blocking of the gates can be determined based on the temperature of the electric device, because the electric device is heated by the electric current flowing through a closed circuit formed due to the switching element where an ON-failure is present.

In the malfunction determining device for a drive circuit according to the first aspect, which determines whether a malfunction is present based on the temperature of the electric device, the malfunction determiner may determine that a malfunction is present when the detected temperature becomes equal to or higher than the predetermined temperature. Also, the electric device may be a multiphase alternating-current motor that can receive and output power. The temperature detector may be formed of multiple temperature sensors that are provided at respective positions between all the phases of the multiphase alternating-current motor. The malfunction determiner may determine that a malfunction is present, when the highest temperature among the temperatures detected by the respective temperature sensors becomes equal to or higher than the predetermined temperature.

Thus, it is possible to determine whether a malfunction is present based on the temperature of the phase through which a short-circuit current flows.

Alternatively, the electric device may be a multiphase alternating-current motor that can receive and output power; the temperature detector may be formed of multiple temperature sensors that are provided at the respective positions between all the phases of the multiphase alternating-current motor; and the malfunction determiner may determine that a malfunction is present, when a change in the highest temperature among the temperatures detected by the respective temperature sensors becomes equal to or higher than the predetermined value, or when a rate of change in the highest temperature becomes equal to or higher than the predetermined rate.

In the malfunction determining device for a drive circuit according to the first aspect, which determines whether a malfunction is present based on the temperature of the electric device, the electric device may be a multiphase alternating-current motor that can receive and output power. The temperature detector may be formed of multiple temperature sensors that are provided at part of respective positions between all the phases of the multiphase alternating-current motor. The malfunction determiner may determine whether a malfunction is present based on the temperatures detected by the respective temperature sensors.

Thus, the number of components can be reduced, in comparison to the malfunction determining device where the temperature sensors are provided at the respective positions between all the phases of the multiphase alternating-current sensor. In this case, the multiphase alternating-current motor may be a three-phase alternating-current motor. The temperature detector may be formed of two temperature sensors that are provided at two positions from among the positions between all the phases of the three-phase coil of the three-phase alternating-current motor. In the case where the difference between the two temperatures detected by the respective two temperature sensors is equal to or greater than the predetermined value, when the higher temperature of the two temperatures becomes equal to or higher than the first predetermined temperature, the malfunction determiner may determine that a malfunction is present. In the case where the difference between the two temperatures detected by the two respective temperature sensors is less than the predetermined value, when the higher temperature of the two temperatures becomes equal to or higher than the second predetermined temperature that is lower than the first predetermined temperature, the malfunction determiner may determine that a malfunction is present.

Because short-circuit currents flow through two phases, the temperature at the position between the phases through which the short-circuit currents flow is higher than the temperatures at the other two positions between the phases. Accordingly, when the temperature sensors are provided only at the two positions from among the positions between all the phases, if the two temperatures detected significantly differ from each other, the short-circuit currents flow through the two phases between which the temperature sensor that has detected the higher temperature is provided. On the other hand, if the two temperatures detected are equal to or substantially equal to each other, the short-circuit currents flow through the other two phases between which no temperature sensor is provided. This makes it possible to determine whether a malfunction is present.

In the malfunction determining device for a drive circuit according to the first aspect, the malfunction determiner may determine whether a malfunction is present based on the temperature that is detected after a predetermined time has elapsed since the gates are blocked. This is because increases in the temperature of the drive circuit and the electric device due to transitional heat transmission immediately after the gates are blocked are taken into account. As a result, it is possible to further appropriately determine whether a malfunction has occurred in blocking of the gates.

A second aspect of the invention relates to a drive unit which includes an electric device that generates counter-electromotive force while running, and a drive circuit that drives the electric device using a plurality of switching elements, and which further includes an interrupting device that interrupts electric power supplied from a power source to the drive circuit; a malfunction determining device according the first aspect that determines whether a malfunction is present in the drive circuit; and an interruption controller that trips the interrupting device such that electric power supplied from the power source to the drive circuit is interrupted, when the malfunction determiner of the malfunction determining device determines that a malfunction is present.

With the drive unit according to the second aspect, because the malfunction determining device for a drive circuit according to the first aspect is provided, the effects that can be achieved by the malfunction determining device for a drive circuit according to the first aspect of the invention can be obtained, that is, whether a malfunction has occurred in blocking of the gates of the switching element can be determined. In addition, because electric power supplied from the electric power source to the drive circuit is interrupted when such malfunction in blocking of the gates is detected. Accordingly, it is possible to minimize the influence of the malfunction in blocking of the gates of the switching elements in the drive circuit, which is exerted on the elements other than the drive circuit. Namely, it is possible to more appropriately deal with the malfunction in blocking of the gates.

A third aspect of the invention relates to a first method for determining whether a malfunction is present in a drive circuit that drives an electric device, which generates counter-electromotive force while running, using a plurality of switching elements. According to the first method, it is determined that a malfunction has occurred in blocking of gates of the switching elements, when the temperature of the switching elements in the drive circuit becomes equal to or higher than the predetermined temperature, when a change in the temperature of the switching elements in the drive circuit becomes equal to or greater than the predetermined value, or when a rate of change in the temperature of the switching elements in the drive circuit becomes equal to or higher than the predetermined rate, while all the gates of the switching elements in the drive circuit are blocked.

According to the first method, whether a malfunction has occurred in blocking of the gates can be determined based on the temperature of the switching elements. This is because the switching elements are heated by electric current flowing through the closed circuit formed due to the switching element where an ON-failure is present. It is possible to more appropriately determine whether a malfunction has occurred in blocking of the gates, because it is determined that a malfunction is present when the temperature of the switching elements becomes equal to or higher than the predetermined temperature, when the change in the temperature of the switching elements becomes equal to or greater than the predetermined value, or when the rate of change in the temperature becomes equal to or higher than the predetermined rate.

A fourth aspect of the invention relates to a second method for determining whether a malfunction is present in a drive circuit that drives an electric device, which generates counter-electromotive force while running, using a plurality of switching elements. According to the second method, it is determined that a malfunction has occurred in blocking of gates of the switching elements, when the temperature of the electric device becomes equal to or higher than the predetermined temperature, when a change in the temperature of the electric device becomes equal to or greater than the predetermined value, or when a rate of change in the temperature of the electric device becomes equal to or higher than the predetermined rate, while all the gates of the switching elements in the drive circuit are blocked.

According to the second method, whether a malfunction has occurred in blocking of the gates can be determined based on the temperature of the electric device. This is because the electric device is heated by electric current flowing through the closed circuit formed due to the switching element where an ON-failure is present. It is possible to more appropriately determine whether a malfunction has occurred in blocking of the gates, because it is determined that a malfunction is present when the temperature of the electric device becomes equal to or higher than the predetermined temperature, when the change in the temperature of the electric device becomes equal to or greater than the predetermined value, or when the rate of change in the temperature of the electric device becomes equal to or higher than the predetermined rate.

BRIEF DESCRIPTION OF THE DRAWINGS

The features, advantages thereof, and technical and industrial significance of this invention will be better understood by reading the following detailed description of example embodiments of the invention, when considered in connection with the accompanying drawings, in which.

DETAILED DESCRIPTION OF THE EXAMPLE EMBODIMENTS

In the following description and the accompanying drawings, the present invention will be described in more detail in terms of example embodiments.

Figure 1:
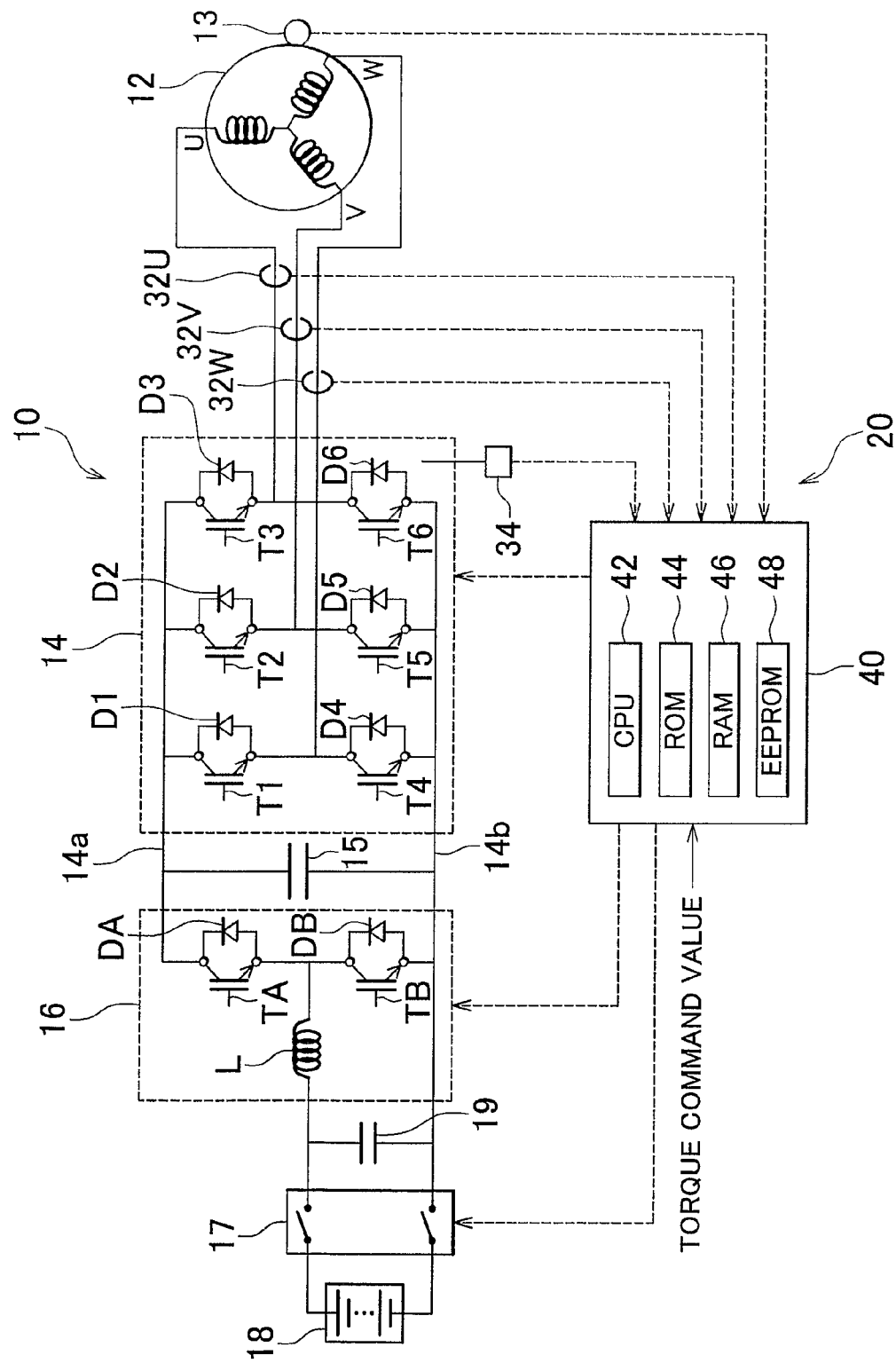
FIG. 1 schematically illustrates the configuration of a drive unit provided with a malfunction determining device for a drive circuit according to a first embodiment of the invention.

FIG. 1 schematically illustrates the configuration of a drive unit 10 provided with a malfunction determining device 20 for a drive circuit according to a first embodiment of the invention. For convenience of description, the configuration of the drive unit 10 will be described first, and, then, the configuration of the malfunction determining device 20 for a drive circuit will be described. The drive unit 10 is configured to be mounted in an automobile. As shown in FIG. 1, the drive unit 10 includes a motor 12 that runs using three-phase alternating current; an inverter circuit 14 that can convert direct current into alternating current and supply the alternating current to the motor 12; a converter circuit 16 that can change the voltage of direct current supplied from a battery 18 and supply the direct current to the inverter circuit 14; and an electronic control unit (hereinafter, referred to as an "ECU") 40 that controls the entire drive unit 10 and that also serves as a part of the malfunction determining device 20 according to the first embodiment.

The motor 12 may be, for example, a PM (permanent magnet) type synchronous generator motor, which includes a rotor where a permanent magnet is attached onto the outer surface, and a stator on which a three-phase coil is wound. The rotating shaft of the motor 12 may be directly or indirectly connected to the drive shaft of the drive unit 10 such that power from the motor 12 can be output to the drive shaft of the drive unit 10. Also, because the motor 12 is a generator motor, if power is input in the rotating shaft of the motor 12, the motor 12 can generate electric power. Namely, the motor 12 generates counter-electromotive force based on the motor speed.

The inverter circuit 14 includes six transistors T1 to T6 and six diodes D1 to D6. The six transistors T1 to T6 are provided between a positive bus bar 14a and a negative bus bar 14b of the inverter circuit 14 such that three pairs of transistors are arranged. In each pair, one transistor is located on the source side, and the other transistor is located on the sink side. The U-phase coil, the V-phase coil, and the W-phase coil of the three-phase coil of the motor 12 are connected to the respective lines that connect the two transistors to each other in each of the three pairs. Also, the six diodes D1 to D6 are connected to the respective six transistors T1 to T6 in back-to-back manner. Accordingly, a rotating magnetic field is formed in the three-phase coil by controlling the ratio of the ON-time of the transistors T1 to T6 when a voltage is applied between the positive bus bar 14a and the negative bus bar 14b, which enables the motor 12 to run. Also, a capacitor 15 for smoothing electric current is connected to the positive bus bar 14a and the negative bus bar 14b of the inverter circuit 14.

The converter circuit 16 includes two transistors TA and TB, two diodes DA and DB, and a reactor L. The transistor TA is connected to the positive bus bar 14a of the inverter circuit 14 and the transistor TB is connected to the negative bus bar 14b of the inverter circuit 14. The reactor L is connected to the line connecting the two transistors TA and TB to each other. The positive terminal and the negative terminal of the battery 18 are connected to the reactor L and the negative bus bar 14b of the inverter circuit 14, respectively, via a circuit breaker 17. The two diodes DA and DB are connected to the two transistors TA and TB, respectively, in the back-to-back manner. Accordingly, by controlling the ratio between ON-time and-OFF time for each of the transistor TA and the transistor TB, it is possible to increase the voltage of the direct current supplied from the battery 18 and output it to the inverter circuit 14, or reduce the voltage of the direct current applied to the positive bus bar 14a and the negative bus bar 14b of the inverter circuit 14 and then charge the battery 18. Also, a capacitor 19 for smoothing electric current is connected to the line connecting the terminals of the battery 18 to each other.

The ECU 40 is formed of a microprocessor mainly including a CPU 42. In addition to the CPU 42, the ECU 40 includes ROM 44 that stores processing programs; RAM 46 that temporarily stores data; EEPROM 48 that serves as non-volatile memory; and an input port (not shown) and an output port (not shown). The ECU 40 receives, through the input port, signals indicating a turning position θ of the rotor of the motor 12 transmitted from a turning position detecting sensor 13 (e.g. a resolver), signals indicating phase currents Iu, Iv, and Iw passing through the three phases of the three-phase coil of the motor 12, which are transmitted from current sensors 32U, 32V and 32W, respectively, signals indicating an inverter temperature Tinv of the inverter circuit 14 transmitted from a temperature sensor 34. Also, the ECU 40 outputs, through the output port, PWM (pulse width modulation) signals for controlling the ON-OFF states of the transistors T1 to T6 of the inverter circuit 14, the transistors TA and TB of the converter circuit 16, and signals for tripping the circuit breaker 17.

With the drive unit 10 thus configured, the motor 12 is driven such that, when a torque command value set based on the operation amount of the accelerator pedal, a vehicle speed, and the like is input, the motor 12 outputs torque corresponding to the torque command value. Because this control of the motor 12 is not the primary focus of the invention, a detailed description thereof will not be made here.

The malfunction determining device 20 for a drive circuit according to the first embodiment is configured as the device that determines whether a malfunction is present when all the gates of the six transistors T1 to T6 in the inverter circuit 14 of the drive unit 10 are blocked. More specifically, the malfunction determining device 20 includes an ECU 40 and the temperature sensor 34 that detects the temperature of the inverter circuit 14. Hereafter, the manner by which the ECU 40 determines whether a malfunction is present when the gates of the transistors T1 to T6 in the inverter circuit 14 are blocked will be described in detail.

Figure 2:
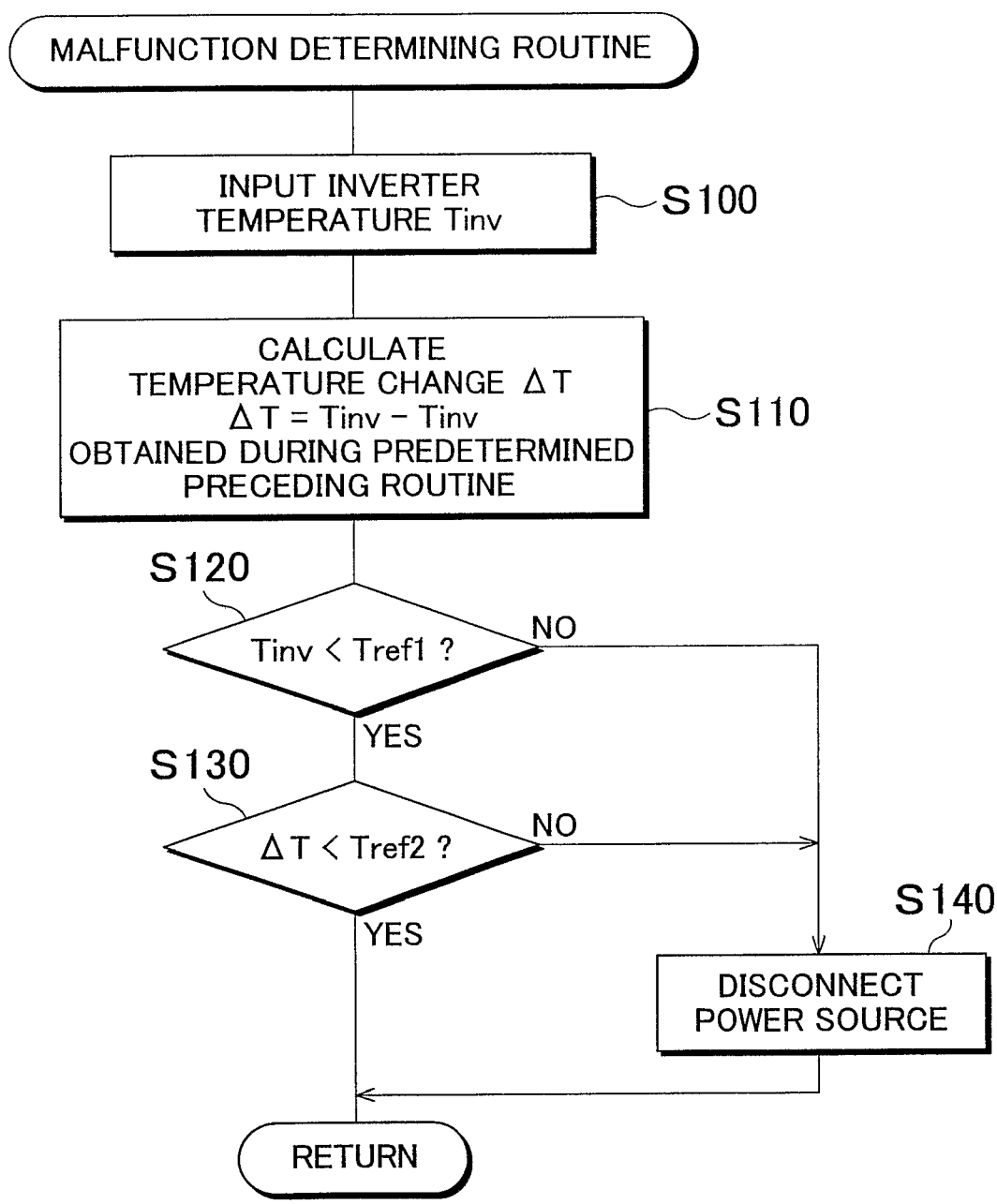
FIG. 2 illustrates the flowchart showing an example of the malfunction determination routine performed by an electronic control unit.

FIG. 2 illustrates an example of the malfunction determination routine that is repeatedly performed by the ECU 40 according to the first embodiment when the gates of the transistors T1 to T6 in the inverter circuit 14 are blocked. In the malfunction determination routine, the CPU 42 of the ECU 40 first receives the inverter temperature Tinv from the temperature sensor 43 (step S100), and calculates a temperature change ΔT by subtracting the inverter temperature Tinv that is received during a predetermined preceding routine from the current inverter temperature Tinv received in the current routine (step S110). The CPU 42 then determines whether the received inverter temperature Tinv is equal to or lower than a threshold value Tref1 (step S120), and determines whether the calculated temperature change ΔT is less than a threshold value Tref2 (step S130). Here, the threshold value Tref1 may be set to the upper limit of the operating temperature of the inverter circuit 14 or a temperature close to the upper limit. The threshold value Tref2 may be set to a value that is greater than the increase in the temperature when the gates of the transistors T1 to T6 in the normally operating inverter circuit 14 are blocked. Because the gates of the transistors T1 to T6 in the inverter circuit 14 are blocked when the routine is performed, the six transistors T1 to T6 are all OFF. Accordingly, the temperature of the inverter circuit 14 does not usually increase. When an ON-failure is present in at least one of the six transistors T1 to T6, for example, when an ON-failure is present in the transistor T1, the transistor T1 remains ON even though the gates of the transistors T1 to T6 in the inverter circuit 14 are blocked. Accordingly, a closed circuit is formed by the transistor T1, the W-phase coil of the motor 12, the U-phase or the V-phase coil of the motor 12, the diode D3 or the diode D2, and the transistor T1. As a result, when the motor 12 is running, electric current flows through the closed circuit due to the counter-electromotive force generated in the motor 12. Accordingly, the transistor and the diode through which the electric current flows are heated, increasing the temperature of the inverter circuit 14. In the first embodiment, such a phenomenon is regarded as a malfunction. To determine whether such a malfunction is present, the inverter temperature Tinv is compared with the threshold value Tref1 and the temperature change ΔT of the inverter temperature Tinv is compared with the threshold value Tref2. Instead of the temperature change ΔT, the rate of change in the temperature per unit time may be calculated, and whether a malfunction is present may be determined by comparing the rate of change in the temperature with the threshold value that is a predetermined rate in the temperature.

When the inverter temperature Tinv is lower than the threshold value Tref1 and the temperature change ΔT is less than the threshold value Tref2, it is determined that an ON-failure is not present in any of the six transistors T1 to T6, and the routine ends. However, when the inverter temperature Tinv is equal to or higher than the threshold value Tref1 or when the temperature change ΔT is equal to or greater than the threshold value Tref2, it is determined that an ON-failure is present in at least one of the six transistors T1 to T6, and, therefore, a malfunction has occurred in blocking of the gates. When either of the above conditions is satisfied, the circuit breaker 17 is tripped, which disconnects the battery 18 from the inverter circuit 14 (step S140), after which the routine ends.

With the malfunction determining device according to the first embodiment described above, it is possible to more appropriately determine whether a malfunction has occurred in blocking of the gates due to an ON-failure in at least one of the six transistors T1 to T6 of the inverter circuit 14, based on the inverter temperature Tinv and the temperature change ΔT after the gates are blocked.

With the drive unit 10 according to the first embodiment, the influence of the ON-failure in the transistor on the other elements can be minimized when the malfunction determining device determines that a malfunction is present, because the battery 18 is disconnected from the inverter circuit 14 by tripping the circuit breaker 17.

In the malfunction determining device for a drive circuit according to the first embodiment, it is determined that a malfunction has occurred in blocking of the gates due to an ON-failure in the transistor, when the inverter temperature Tinv is equal to or higher than the threshold value Tref1 and the temperature change ΔT in the inverter temperature Tinv is equal to or greater than the threshold value Tref2. Alternatively, the malfunction determining device may be set to determine that a malfunction is present only when one or the other of the described conditions is satisfied.

In the first embodiment described above, the invention is used to determine whether a malfunction has occurred in blocking of the gates of the transistors T1 to T6 in the inverter circuit 14 that drives the motor 12. However, the invention may also be applied in any types of circuit to determine whether a malfunction has occurred in blocking of the gates, as long as the circuit drives an electric device that generates a counter-electromotive force while running and includes switching elements.

Figure 3:
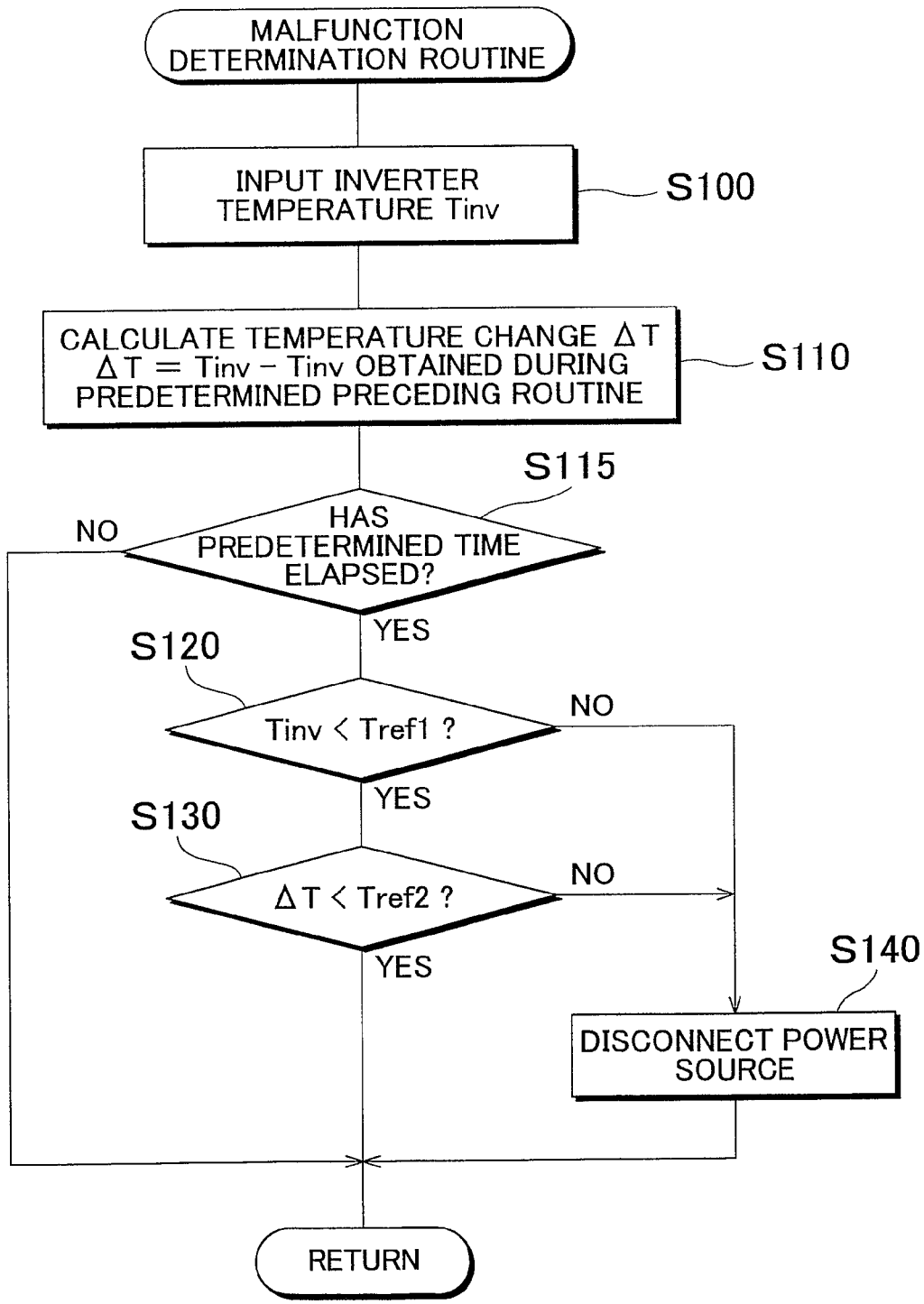
FIG. 3 illustrates the flowchart showing an example of the malfunction determination routine according to a modified example.
Figure 4:
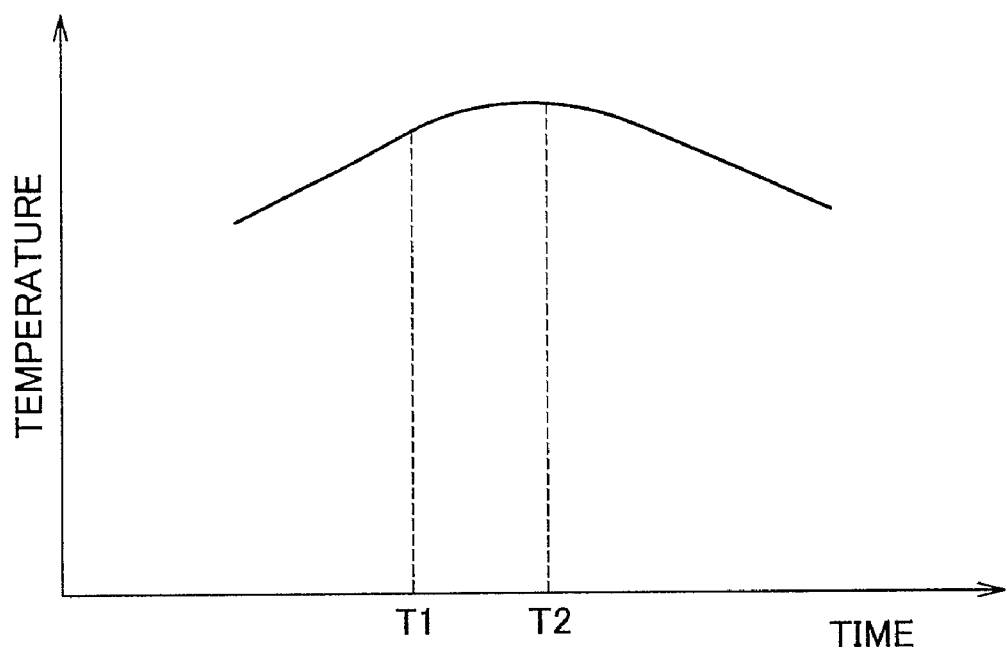
FIG. 4 illustrates the graph showing a manner in which the temperature of an inverter circuit 14 changes when the gates of switching elements are blocked.

With the malfunction determining device 20 according to the first embodiment, it is determined whether a malfunction has occurred in blocking of the gates due to an ON-failure in at least one of the six transistors T1 to T6 of the inverter circuit 14, based on the inverter temperature Tinv or the temperature change ΔT after the gates are blocked. However, it may be determined whether a malfunction has occurred in blocking of the gates due to an ON-failure in at least one of the six transistors T1 to T6 of the inverter circuit 14, based on the inverter temperature Tinv and the temperature change ΔT after a predetermined time has elapsed since the gates are blocked. In this case, the malfunction determination routine in FIG. 3 is performed instead of the malfunction determination routine in FIG. 2. In the routine in FIG. 3, the inverter temperature Tinv is input in step S100, the temperature change ΔT is calculated in step S110, and whether a predetermined time has elapsed since the gates are blocked is determined in step S115. If it is determined that the predetermined time has not elapsed, the malfunction determination routine ends. On the other hand, if it is determined that the predetermined time has elapsed, it is then determined whether the inverter temperature Tinv is lower than the threshold value Tref1 in step S120. Then, it is determined whether the temperature change ΔT is less than the threshold value Tref2 in step S130. Whether a malfunction has occurred in blocking of the gates is determined after the predetermined time has elapsed since the gates are blocked, because the temperature slightly increases due to the heat conducted from the transistors T1 to T6 in the inverter circuit 14 even after the gates are blocked, and the temperature sensor 34 detects such an increase. Accordingly, it is possible to more appropriately determine whether a malfunction is present, if the determination is made after such an increase in the temperature due to the heat conduction ends. FIG. 4 shows an example of such an increase in the temperature. As shown in FIG. 4, the temperature slightly increases from time T1, at which the gates are blocked, to time T2. Accordingly, the predetermined time should be set to a time equal to or longer than the time from time T1 to time T2. The predetermined time is set depending on the performance of, for example, the inverter circuit 14 and the motor 12, based on the results of experiments.

Figure 5:
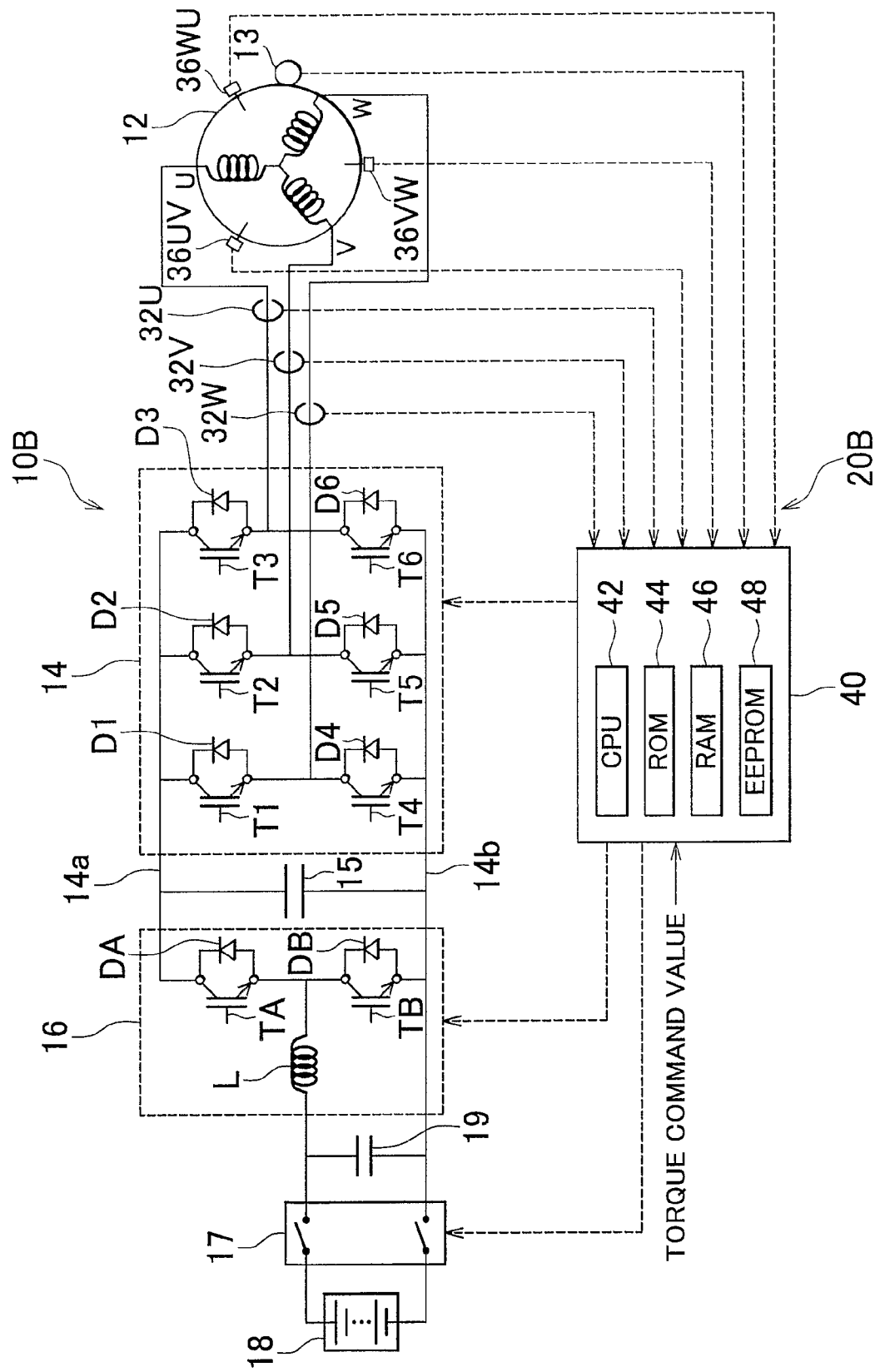
FIG. 5 schematically illustrates the configuration of a drive unit provided with a malfunction determining device for a drive circuit according to a second embodiment of the invention.

Next, a malfunction determining device 20B for a drive circuit and a drive unit 10B according to a second embodiment will be described. FIG. 5 schematically illustrates the configuration of the drive unit 10B provided with the malfunction determining device 20B for a drive circuit according to the second embodiment. As shown in the figures, the malfunction determining device 20B for a drive circuit and the drive unit 10B according to the second embodiment have the same configurations as those of the malfunction determining device 20 for a drive circuit and the drive unit 10 according to the first embodiment, except that the temperature sensor 34 is not provided, and three temperature sensors 36UV, VW, and WU are provided at the respective positions between all the phases of the three-phase coil. The temperature sensor 36UV is provided between the U-phase and the V-phase, the temperature sensor VW is provided between the V-phase and the W-phase, and the temperature sensor WU is provided between the W-phase and the U-phase in the second embodiment. For ease of explanation, the same portions in the malfunction determining device 20B and the drive unit 10B in the second embodiment as those in the malfunction determining device 20 and the drive unit 10 in the first embodiment will be denoted by the same reference numerals, and the detailed description thereof will not be made below.

In the malfunction determining device 20B for a drive circuit according to the second embodiment, the temperatures Tuv, Tvw, and Twu detected by the respective three temperature sensors 36UV, 36VW, and 36WU are input in the input port (not shown) of the ECU 40 through signal lines.

Figure 6:
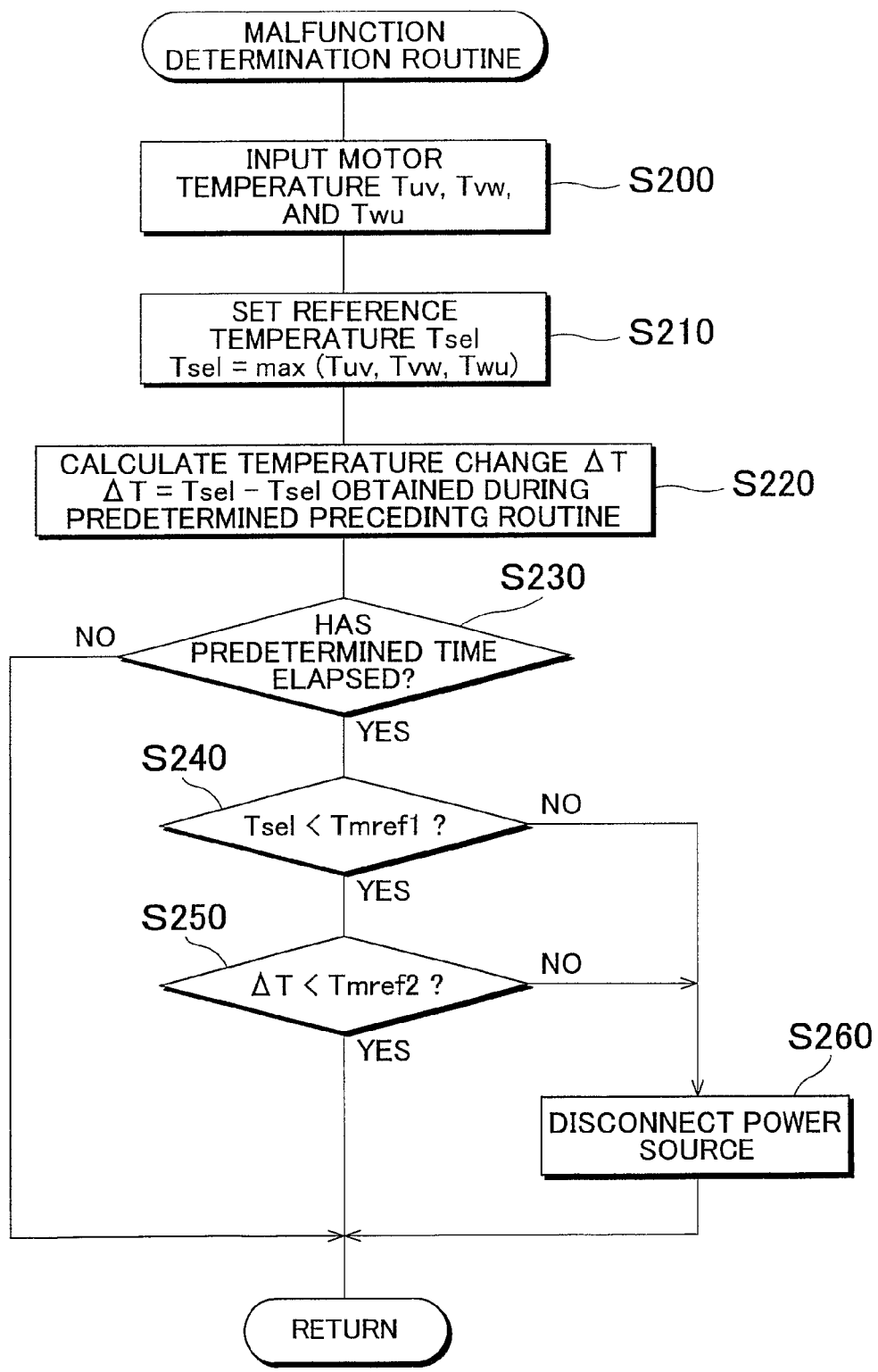
FIG. 6 illustrates the flowchart showing an example of the malfunction determination routine performed by the electronic control unit according to the second embodiment.

In the malfunction determining device 20B for a drive circuit according to the second embodiment, whether a malfunction has occurred in blocking of the gates is determined by performing the malfunction determination routine shown in FIG. 6. In the malfunction determination routine, the CPU 42 of the ECU 40 initially receives the temperatures Tuv, Tvw, and Twu from the respective three sensors 36UV, 36VW, and 36WU (step S200), then sets the highest temperature among the three temperatures Tuv, Tvw, and Twu as the reference temperature Tsel (step S210), and calculates the temperature change ΔT by subtracting the reference temperature Tsel obtained during a predetermined preceding routine from the reference temperature Tsel set during the currently performed routine (step S220). Then, the CPU 42 determines whether a predetermined time has elapsed since the gates are blocked (step S230). If an affirmative determination is made in step S230, the CPU 42 then determines whether the reference temperature Tsel is lower than the threshold value Tmref1 (step S240), and then determines whether the temperature change ΔT is less than the threshold value Tmref2 (step S250). In this case, the threshold value Tmref1 is set to the upper limit of the operating temperature of the motor 12 or a value close to the upper limit. The threshold value Tmref2 is set to a value greater than a normal increase in the temperature of the motor 12 when the gates of the normally operating inverter circuit 14 are blocked.

Figure 7:
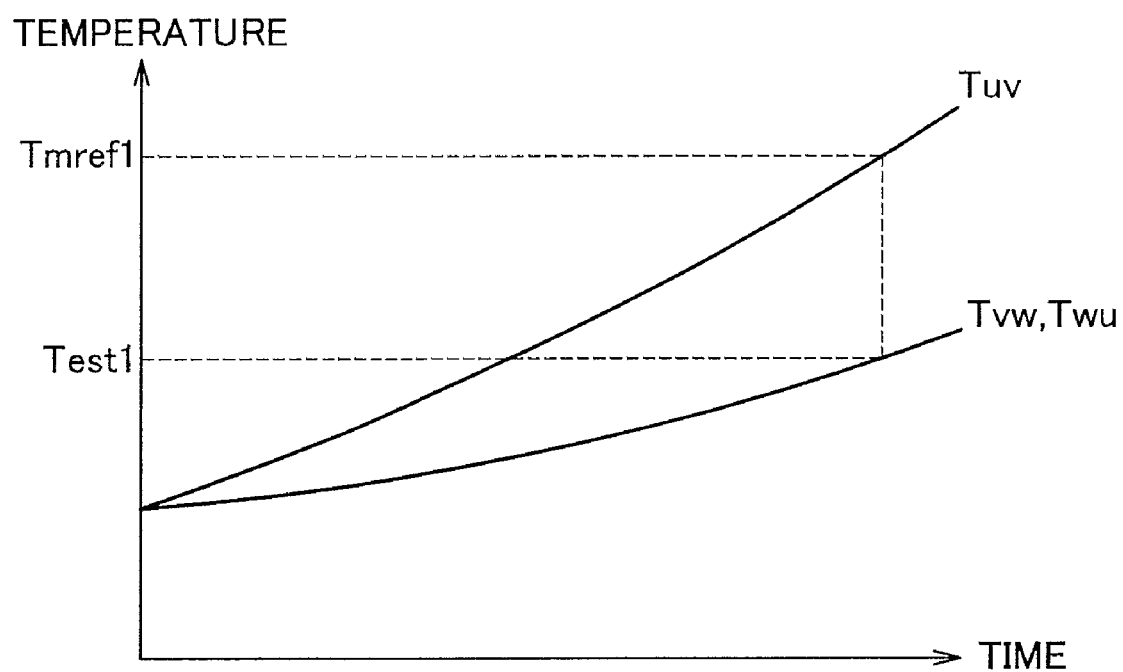
FIG. 7 illustrates the graph showing an example a manner in which the temperatures change, when a closed-circuit is formed due to counter-electromotive force generated by a motor, and electric currents flow through the U-phase and the V-phase of a three-phase coil of the motor.

As described above, if the gates of the inverter circuit 14 are blocked, the six transistors T1 to T6 are all turned OFF. Accordingly, electric currents do not flow through the three-phase coil of the motor 12, and, therefore, the temperature of the motor 12 does not increase. If an ON-failure is present in at least one of the transistors T1 to T6, for example, if an ON-failure is present in the transistor T1, even when the gates of the inverter circuit 14 are blocked, the transistor T1 remains ON. As a result, a closed-circuit is formed by the transistor T1, the W-phase coil of the motor 12, the U-phase or the V-phase coil of the motor 12, the diode D3 or the diode D2, and the transistor T1. When the motor 12 is running, an electric current flows through the closed-circuit due to the counter-electromotive force generated by the motor 12. Therefore, the coil through which an electric current is heated, increasing the temperature of the motor 12. In the second embodiment, to determine such a phenomenon as a malfunction, the reference temperature Tsel, which is the highest temperature among the three temperatures Tuv, Tvw, and Twu, is compared with the threshold value Tmref1, and the temperature change ΔT of the reference temperature Tsel is compared with the threshold value Tmref2. In the case where the closed-circuit is formed due to the counter-electromotive force generated by the motor 12, and electric currents flow through the U-phase and the V-phase of the three-phase coil, the temperature Tuv detected by the temperature sensor 36UV is higher than the temperatures detected by the other temperature sensors 36VW and 36WU. Thus, the highest temperature among the three temperatures Tuv, Tvw, and Twu is used as the reference temperature Tsel. FIG. 7 shows an example of the temporal change in the temperatures Tuv, Tvw, and Twu when the closed-circuit is formed due to the counter-electromotive force generated by the motor 12 and electric currents flow through the U-phase and the V-phase of the three-phase coil of the motor 12. In this case, it is determined that a malfunction is present, when the temperature Tuv is equal to or higher than the threshold value Tmref1 or when the temperature change ΔT of the temperature Tuv is equal to or greater than the threshold value Tmref2.

When the reference temperature Tsel is lower than the threshold value Tmref1 and the temperature change ΔT is less than the threshold value Tmref2, it is determined than an On-failure is not present in any of the six transistors T1 to T6, after which the routine ends. On the other hand, when the reference temperature Tsel is equal to or higher than the threshold value Tmref1 or the temperature change ΔT is equal to or greater than the threshold value Tmref2, it is determined that a malfunction has occurred in blocking of the gates because an ON-failure is present in at least one of the six transistors T1 to T6. Therefore, the battery 18 serving as a power source is disconnected from the inverter circuit 14 serving as a drive circuit by tripping the circuit breaker 17 (step S260), after which the routine ends. As described so far, the influence of the ON-failure present in the transistor, which is exerted on the other elements, can be minimized by disconnecting the battery 18 from the inverter circuit 14 if it is determined that an ON-failure is present in at least one of the six transistors T1 to T6 in the inverter circuit 14. Instead of the temperature change ΔT, a rate of temperature change per unit time may be calculated. Then, the temperature change rate per unit time may be compared with the threshold value, which is the predetermined temperature change rate, to determine whether a malfunction is present.

With the malfunction determining device 20B for a drive circuit according to the second embodiment described so far, it is possible to more appropriately determine whether a malfunction has occurred in blocking of the gates due to an ON-failure in at least one of the six transistors T1 to T6 in the inverter circuit 14, based on the temperatures Tuv, Tvw, and Twu detected by the respective temperature sensors 36UV, 36VW, and 36WU and the temperature change ΔT thereof after the gates are blocked. In addition, it is possible to further appropriately determine whether a malfunction is present, because whether a malfunction has occurred in blocking of the gates is determined based on the temperatures Tuv, Tvw, and Twu detected at the respective positions between all the phases of the three-phase coil of the motor 12, the temperature change ΔT, or the rate of change in the temperature after the predetermined time has elapsed since the gates are blocked.

Also, with the drive unit 10B according to the second embodiment, the influence of the ON-failure in the transistor, which is exerted on the other elements, can be minimized, because the battery 18 is disconnected from the inverter circuit 14 by tripping the circuit breaker 17 if the malfunction determining device determines that a malfunction is present.

With the malfunction determining device 20B for a drive circuit according to the second embodiment, it is determined that a malfunction has occurred in blocking of the gates due to an ON-failure in the transistor, if the reference temperature Tsel is equal to or higher than the threshold value Tmref1 and the temperature change ΔT of the reference temperature Tsel is equal to or greater than the threshold value Tmref2. Alternatively, the malfunction determining device 20B may be set to determine that a malfunction has occurred in blocking of the gates due to an ON-failure in the transistor only when one or the other of the described conditions is satisfied.

With the malfunction determining device 20B according to the second embodiment, the temperature sensors are provided at the respective positions between the U-phase and the W-phase, between the W-phase and the V-phase, and between the V-phase and the U-phase of the motor 12 using the three-phase coil. However, the temperature sensors may be provided at the respective positions between all the phases of the multiphase alternating-current motors other than the three-phase motor. In this case, it is determined whether a malfunction has occurred in blocking of the gates using the highest temperature among the temperatures detected by the respective temperature sensors as the reference temperature Tsel.

Figure 8:
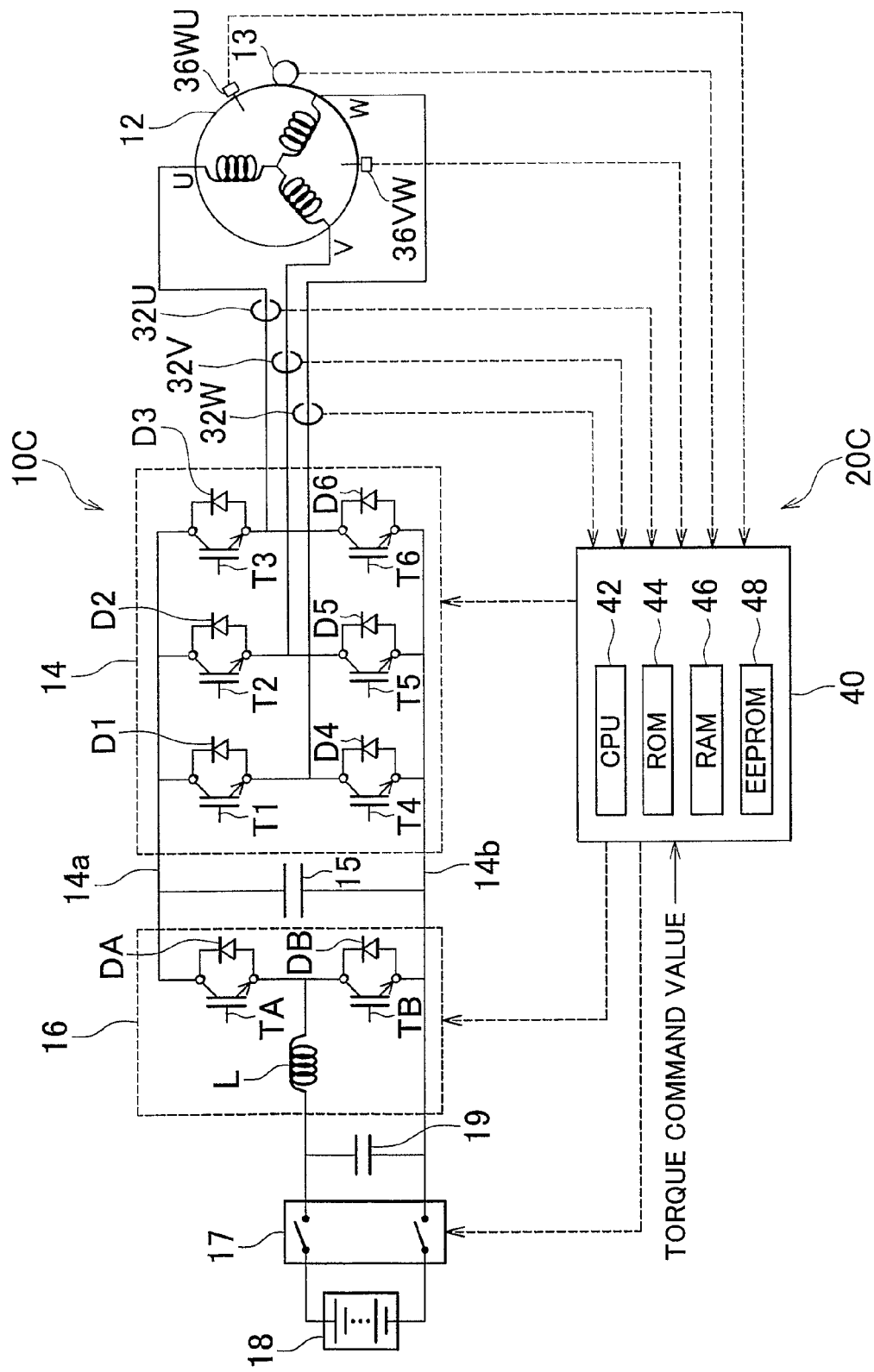
FIG. 8 schematically illustrates the configuration of a drive unit provided with a malfunction determining device for a drive circuit according to a third embodiment of the invention.

Next, a malfunction determining device 20C for a drive circuit and a drive unit 10C according to a third embodiment of the invention will be described. FIG. 8 schematically illustrates the configuration of the drive unit provided with the malfunction determining device 20C for a drive circuit according to the third embodiment. As shown in the figures, the malfunction determining device 20C for a drive circuit and the drive unit 10C according to the third embodiment have the same configurations as those of the malfunction determining device 20B for a drive circuit and the drive unit 10B according to the second embodiment, except that the temperature sensor is not provided between the U-phase and the V-phase of the three-phase coil of the motor 12. For ease of explanation, the same portions in the malfunction determining device 20C and the drive unit 10C in the third embodiment as those in the malfunction determining device 20B and the drive unit 10B in the second embodiment will be denoted by the same reference numerals, and the detailed description thereof will not be made below.

Figure 9:
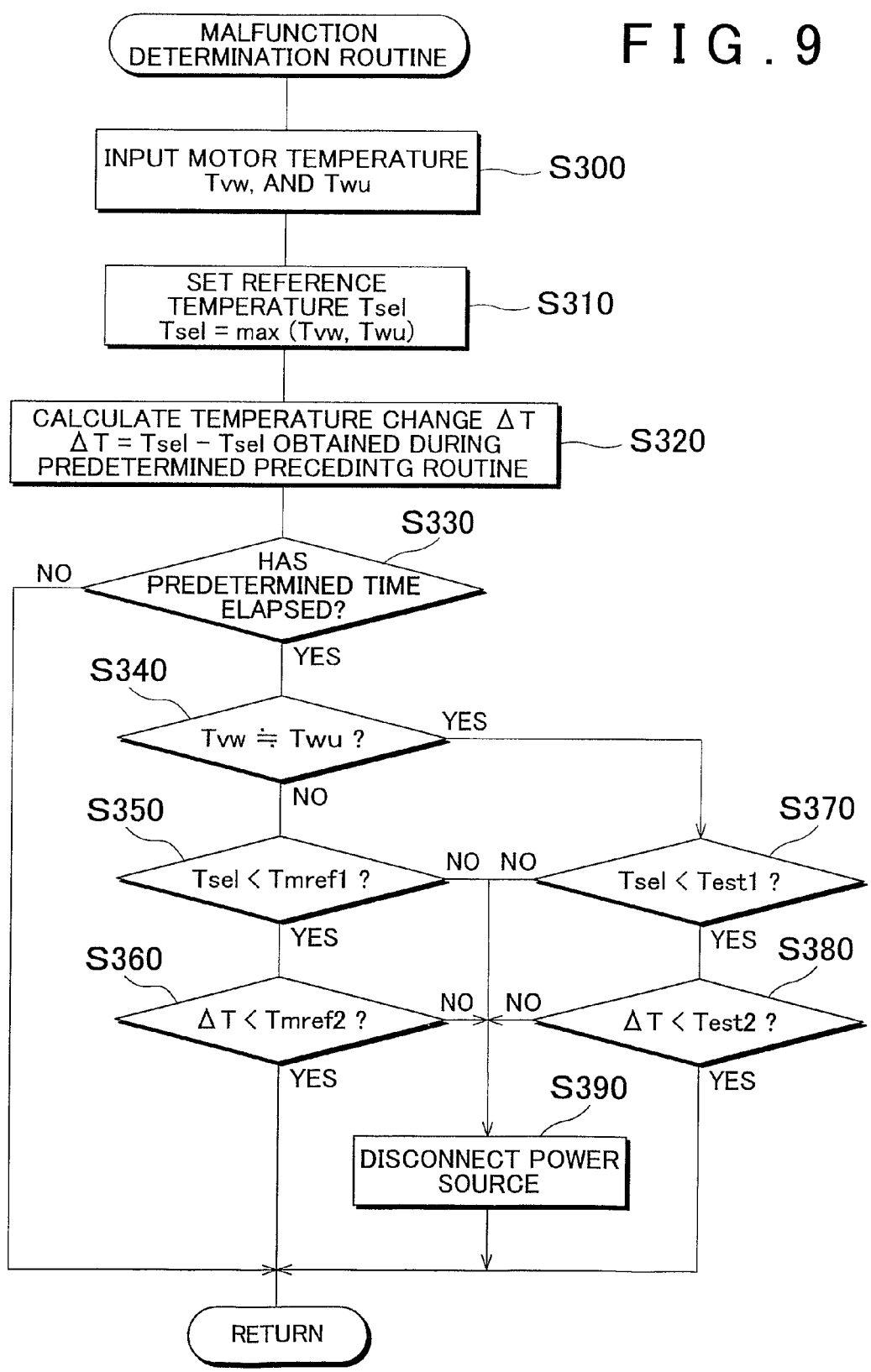
FIG. 9 illustrates the flowchart showing an example of the malfunction determination routine performed by the electronic control unit according to the third embodiment.

With the malfunction determining device 20C for a drive circuit according to the third embodiment, whether a malfunction has occurred in blocking of the gates is determined by performing the malfunction determination routine shown in FIG. 9. In the malfunction determination routine in FIG. 9, the CPU 42 of the ECU 40 initially receives the temperatures Tvw and Twu detected by the respective two temperature sensors 36VW and 36WU (step S300), and sets the higher temperature of the two temperatures Tvw and Twu received as the reference temperature Tsel (step S310). Then, the CPU 42 calculates the temperature change ΔT by subtracting the reference temperature Tsel set during a predetermined preceding routine from the reference temperature Tsel set in the currently performed routine (step S320). Then, the CPU 42 determines whether a predetermined time has elapsed since the gates are blocked (step S330). If an affirmative determination is made in step S330, the CPU 42 determines whether the temperatures Tvw and Twu are equal to or substantially equal to each other (step S340). As in the above-description, made by using FIG. 7, concerning the temperatures at the respective positions between all the phases when electric currents flow through two phases of the three-phase coil, the temperature at the position between the two phases through which the electric currents flow increases, and becomes higher than the temperatures at the other positions between the phases. In the case where a closed-circuit is formed due to the counter-electromotive force generated by the motor 12 and electric currents flow through the U-phase and the V-phase of the three-phase coil of the motor 12, the temperature Tuv at the position between the U-phase and the V-phase increases, and becomes higher than the temperatures Tvw and Twu at the other two positions between the phases. At this time, the temperatures Tvw and Twu are equal to or substantially equal to each other. In the case where electric currents flow through the V-phase and the W-phase of the three-phase coil, the temperature Tvw at the position between the V-phase and the W-phase increases, and becomes higher than the temperatures Twu and Tuv at the other two positions between the phases. At this time, the temperatures Tvw and Twu are neither equal to nor substantially equal to each other. In the third embodiment, whether the temperatures Tvw and Twu are equal to or substantially equal to each other is determined.

When the temperatures Tvw and Twu are neither equal to nor substantially equal to each other, it is then determined whether the reference temperature Tsel is lower than the threshold value Tmref1 (step S350), and it is determined whether the temperature change ΔT is less than the threshold value Tmref2 (step S3600. When the reference temperature Tsel is lower than the threshold value Tmref1 and the temperature change ΔT is less than the threshold value Tmref2, it is determined that an ON-failure is not present in any of the six transistors T1 to T6, after which the routine ends. On the other hand, when it is determined that the reference temperature Tsel is equal to or higher than the threshold value Tmref1 or the temperature change ΔT is equal to or greater than the threshold value Tmref2, it is determined that a malfunction is present due to an ON-failure present in at least one of the six transistors T1 to T6. Then, the battery 18 serving as a power source is disconnected from the inverter circuit 14 serving as a drive circuit by tripping the circuit breaker 17 (step S390), after which the routine ends. Descriptions concerning the threshold value Tmref1 and the threshold value Tmref2 have made in the second embodiment.

When it is determined that the temperatures Tvw and Twu are equal to or substantially equal to each other, it is then determined whether the reference temperature Tsel is lower than the threshold value Test 1 that is lower than the threshold value Tmref1 (step S370), and it is determined whether the temperature change ΔT is less than the threshold value Test2 that is less than the threshold value Tmref2 (step S380). When the reference temperature Tsel is lower than the threshold value Test1 and the temperature change ΔT is less than the threshold value Test2, it is determined that an ON-failure is not present in any of the six transistors T1 to T6, after which the routine ends. On the other hand, when the reference temperature Tsel is equal to or higher than the threshold value Test1 or the temperature change ΔT is equal to or greater than the threshold value Test2, it is determined that a malfunction has occurred in blocking of the gates due to an ON-failure in at least one of the six transistors T1 to T6. Then, the battery 18 serving as a power source is disconnected from the inverter circuit 14 serving as a drive circuit by tripping the circuit breaker 17 (step S390), after which the routine ends. In the case where electric currents flow through the U-phase and the V-phase of the three-phase coil of the motor 12, whether a malfunction is present is determined by comparing the temperature Tuv at the position between the U-phase and the V-phase with the threshold value Tmref1. The threshold value Test1 is compared with the temperatures Tvw and Twu at the other two positions between the phases to determine whether a malfunction is present. FIG. 7 shows the relationship between the threshold value Tmref1 and the threshold value Test1. In the case where electric currents flow through the U-phase and the V-phase of the three-phase coil of the motor 12, whether a malfunction is present is determined by comparing the change in the temperature Tuv at the position between the U-phase and the V-phase with the threshold value Tmref2. The threshold value Test2 is compared with the changes in the temperatures Tvw and Twu at the other two positions between the phases to determine whether a malfunction is present. Instead of the temperature change ΔT, a temperature change rate per unit time may be calculated. Then, the temperature change rate may be compared with the threshold value, which is a predetermined temperature change rate, to determine whether a malfunction is present.

With the malfunction determining device 20C for a drive circuit according to the third embodiment described so far, it is possible to more appropriately determine whether a malfunction has occurred in blocking of the gates due to an ON-failure in at least one of the transistors T1 to T6 in the inverter circuit 14, based on the temperatures Tvw and Twu detected by the two temperature sensors 36VW and 36WU provided between the corresponding positions between the phases of the three phase coil of the motor 12 and the temperature change ΔT thereof after the gates are blocked. As a result, the temperature sensor 36UV need not be provided, and the number of the components can be made smaller than that of the malfunction determining device 20B for a drive circuit according to the second embodiment. More appropriate determination can be made, because whether a malfunction is present is determined based on the temperatures Tvw and Twu at the corresponding positions between the phases of the three-phase coil of the motor 12 or the temperature change ΔT thereof after the predetermined time has elapsed since the gates are blocked.

With the drive unit 10C according to the third embodiment, when the malfunction determining device determines that a malfunction is present, the battery 18 is disconnected from the inverter circuit 14 by tripping the circuit breaker 17. Accordingly, the influence of the ON-failure present in the transistor, which is exerted on the other elements, can be minimized.

In the malfunction determining device 20C for a drive circuit according to the third embodiment, when the reference temperature Tsel is equal to or higher than the threshold value Tmref1 and when the temperature change ΔT of the reference temperature Tsel is equal to or greater than the threshold value Tmref2, it is determined that a malfunction has occurred in blocking of the gates due to an ON-failure in the transistor. However, it may be determined that a malfunction has occurred in blocking of the gates due to an ON-failure in the transistor, when either of the above conditions is satisfied.

In the malfunction determining device 20C for a drive circuit according to the third embodiment, the temperature sensor is not provided between the U-phase and the V-phase of the three-phase coil of the motor 12, and the temperature sensors are provided at the positions between the V-phase and the W-phase, and between the W-phase and the U-phase. However, the temperature sensors may be provided at the positions between the W-phase and the U-phase, and between the U-phase and the V-phase without providing the temperature sensor between the V-phase and the W-phase. Alternatively, the temperature sensor may be provided at the positions between the U-phase and the V-phase, and between the V-phase and the W-phase without providing the temperature sensor between the W-phase and the U-phase. Alternatively, the temperature sensors may be provided at part of the positions between all the phases of the multiphase alternating-current motor other than the three-phase motor.

In the drive unit 10, 10B, and 10C according to the first, second and third embodiments, when the malfunction determining device 20, 20B and 20C determine that a malfunction is present, respectively, the battery 18 is disconnected from the inverter circuit 14 by tripping the circuit breaker 17. However, alternative measures may also be taken such as turning the converter circuit 16 OFF.

While the invention has been described with reference to example embodiments thereof, is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention. The invention can be applied, for example, to the manufacturing industry of the drive unit.

The invention claimed is:

1. A malfunction determining device that determines whether a malfunction is present in a drive circuit, which drives an electric device (12) that generates counter-electromotive force while running, using a plurality of switching elements constituting a drive device, comprising:
   a temperature detector that detects at least one of a temperature of the electric device and a temperature of the drive device; and
   a malfunction determiner that determines whether a malfunction has occurred in blocking of gates of the switching elements based on the temperature detected by the temperature detector when all the gates of the switching elements in the drive circuit are blocked.

2. The malfunction determining device according to claim 1, wherein
   the temperature detector detects a temperature of the switching elements in the drive circuit.

3. The malfunction determining device according to claim 2, wherein
   the malfunction determiner determines that a malfunction is present, when the detected temperature is equal to or higher than a predetermined temperature.

4. The malfunction determining device according to claim 2, wherein
   the malfunction determiner determines that a malfunction is present, when a change in the detected temperature is equal to or greater than a predetermined value.

5. The malfunction determining device according to claim 2, wherein
   the malfunction determiner determines that a malfunction is present, when a rate of change in the detected temperature is equal to or higher than a predetermined rate.

6. The malfunction determining device according to claim 1, wherein
   the electric device is a motor generator that can receive and output power, and
   the drive circuit is an inverter circuit.

7. The malfunction determining device according to claim 1, wherein
   the temperature detector detects the temperature of the electric device.

8. The malfunction determining device according to claim 7, wherein
   the malfunction determiner determines that a malfunction is present, when the detected temperature is equal to or higher than a predetermined temperature.

9. The malfunction determining device according to claim 7, wherein
   the electric device is a multiphase alternating-current motor that can receive and output power;
   the temperature detector is formed of multiple temperature sensors that are provided at respective positions between all phases of the multiphase alternating-current motor; and
   the malfunction determiner determines that a malfunction is present, when the highest temperature among the temperatures detected by the respective temperature sensors is equal to or higher than a predetermined temperature.

10. The malfunction determining device according to claim 7, wherein
    the electric device is a multiphase alternating-current motor that can receive and output power;
    the temperature detector is formed of multiple temperature sensors that are provided at respective positions between all the phases of the multiphase alternating-current motor; and
    the malfunction determiner determines that a malfunction is present, when a change in the highest temperature among the temperatures detected by the respective temperature sensors is equal to or higher than a predetermined value.

11. The malfunction determining device according to claim 7, wherein
    the electric device is a multiphase alternating-current motor that can receive and output power;
    the temperature detector is formed of multiple temperature sensors that are provided at respective positions between all the phases of the multiphase alternating-current motor; and
    the malfunction determiner determines that a malfunction is present, when a rate of change in the highest temperature among the temperatures detected by the respective temperature sensors is equal to or higher than a predetermined rate.

12. The malfunction determining device according to claim 7, wherein
    the electric device is a multiphase alternating-current motor that can receive and output power;
    the temperature detector is formed of multiple temperature sensors that are provided at part of positions between all the phases of the multiphase alternating-current motor; and
    the malfunction determiner determines whether a malfunction is present based on the temperatures detected by the respective temperature sensors.

13. The malfunction determining device according to claim 12, wherein
    the multiphase alternating-current motor is a three-phase alternating-current motor;
    the temperature detector is formed of two temperature sensors that are provided at two positions from among positions between all phases of a three-phase coil of the three-phase alternating-current motor; and, in a case where a difference between two temperatures detected by the respective two temperature sensors is equal to or greater than a predetermined value, when the higher temperature of the two temperatures is equal to or higher than a first predetermined temperature, the malfunction determiner determines that a malfunction is present, and in a case where the difference between the two temperatures detected by the two respective temperature sensors is less than the predetermined value, when the higher temperature of the two temperatures is equal to or higher than a second predetermined temperature that is lower than the first predetermined temperature, the malfunction determiner determines that a malfunction is present.

14. The malfunction determining device according to claim 1, wherein the malfunction determiner determines whether a malfunction is present based on the temperature detected after a predetermined time has elapsed since the gates are blocked.

15. A drive unit including an electric device that generates counter-electromotive force while running, and a drive circuit that drives the electric device using a plurality of switching elements, comprising:

an interrupting device that interrupts electric power supplied from a power source to the drive circuit;

a malfunction determiner according to claim 1 that determines whether a malfunction is present in the drive circuit; and an interruption controller that trips the interrupting device such that electric power supplied from the power source to the drive circuit is interrupted, when the malfunction determiner of the malfunction determining device determines that a malfunction is present.

16. A method for determining whether a malfunction is present in a drive circuit that drives an electric device, which generates counter-electromotive force while running, using a plurality of switching elements, comprising:

determining that a malfunction has occurred in blocking of gates of the switching elements, when at least one of conditions is satisfied where a temperature of the switching elements in the drive circuit is equal to or higher than a predetermined temperature, where a change in the temperature of the switching elements in the drive circuit is equal to or greater than a predetermined value, and where a rate of change in the temperature of the switching elements in the drive circuit is equal to or higher than a predetermined rate, while all the gates of the switching elements in the drive circuit are blocked.

17. A method for determining whether a malfunction is present in a drive circuit that drives an electric device, which generates counter-electromotive force while running, using a plurality of switching elements, comprising:

determining that a malfunction has occurred in blocking of gates of the switching elements, when at least one of conditions is satisfied where a temperature of the electric device is equal to or higher than a predetermined temperature, where a change in the temperature of the electric device is equal to or greater than a predetermined value, and where a rate of change in the temperature of the electric device is equal to or higher than a predetermined rate, while all the gates of the switching elements in the drive circuit are blocked.

* * * * *